United States Patent [19]

Campau

[11] Patent Number: 4,832,073
[45] Date of Patent: May 23, 1989

[54] SYSTEM FOR FILLING A BAITWELL IN A FISHING BOAT

[75] Inventor: Daniel N. Campau, Grand Rapids, Mich.

[73] Assignee: Flow-Rite Controls, Ltd., Grand Rapids, Mich.

[21] Appl. No.: 195,811

[22] Filed: May 19, 1988

[51] Int. Cl.⁴ ............................................. A01K 97/04
[52] U.S. Cl. .................................. 137/110; 137/567; 43/57; 114/255
[58] Field of Search .................. 137/110, 567; 43/55, 43/57; 114/255

[56] References Cited

U.S. PATENT DOCUMENTS

| | | | |
|---|---|---|---|
| 2,936,542 | 5/1960 | Butler et al. | 43/57 |
| 3,220,140 | 11/1965 | Shirley, Sr. | 43/55 |
| 3,797,160 | 3/1974 | Lewis, Jr. | 43/55 |
| 4,033,280 | 7/1977 | Wood et al. | 43/57 X |
| 4,074,651 | 2/1978 | Arduser | 43/57 X |
| 4,589,441 | 5/1986 | Campau | 137/512 |
| 4,708,084 | 11/1987 | Campau | 114/255 |

OTHER PUBLICATIONS

*Livewell Aeration Systems*, by Marine Metal Products (1988-1989).

*Primary Examiner*—John Rivell
*Attorney, Agent, or Firm*—Niro, Scavone, Haller & Niro, Ltd.

[57] ABSTRACT

A distribution system for filling a baitwell in a boat includes a low pressure pump and a dual check valve. The fluid flow into the system is divided so that the pressure on the pump is reduced, thus enabling the use of an inexpensive pump. The check valve permits the influx of fresh water without the need for recirculating the existing water in the baitwell and also prevents backflow from the baitwell.

21 Claims, 1 Drawing Sheet

SYSTEM FOR FILLING A BAITWELL IN A FISHING BOAT

BACKGROUND OF THE INVENTION

This invention relates generally to a system for filling baitwells in sport fishing boats when the desired level of water in the baitwell is higher than that of the source, such as a lake or river.

In sport fishing boats, baitwells have been used so that a fisherman can use live fish as bait. The prior art typically shows a simple but expensive apparatus for filling the baitwell. A high speed water pickup is placed outside the boat hull. When the boat travels at a relatively rapid speed, water is forced into the pickup and through a conduit into the baitwell. The pressure from the water coming into the pickup is great enough to fill the baitwell even when the water level in the baitwell is above that of the external water source. For filling the baitwell when the boat is stationary, a high pressure, high power centrifugal pump is placed in-line between the high speed pickup and the baitwell.

A particular disadvantage of the prior art is that when a boat is moving at high speed and the operator is using the high speed pickup to fill the baitwell, the water pressure in the centrifugal pump is quite high. Therefore, even though the pump is not being operated, a strain is placed on the pump structure and its seals. Consequently, prior art devices have required expensive, multipurpose high flow pumps which cost $80 or more. Moreover, operation of these pumps requires a significant degree of power from the battery.

BRIEF SUMMARY OF THE INVENTION

One of the primary objects of the present invention is to provide an improved system for filling baitwells.

Another object of the invention is to provide a new water distribution system that is simple and yet less expensive and equally durable as previous systems.

Another object of the invention is to provide a system that uses a pump with low power consumption.

A further object of the invention is to fill a baitwell regardless of whether the boat is stationary or moving.

An additional object of the invention is to automatically stop the operation of the pump and yet continue filling the baitwell when the boat accelerates beyond a predetermined speed.

These and other advantages are provided by a special check valve device and arrangement of components in the present invention. In particular, the valve allows external water to be drawn into the system without recirculating the existing water in the baitwell and without requiring all the water flow to pass through the pump. The valve also checks against backflow to maintain the baitwell level above the external water level.

The invention includes a main inlet and means for charging water into the system from the water source, such as a lake. The water flows through a conduit with two outlets. One of the outlets is in communication with a dual check valve and the other outlet is in communication with a pump. The dual check valve has two valve inlets and one valve outlet. One of the valve inlets is in communication with the conduit outlet and the other valve inlet is in communication with the pump discharge port. The valve outlet directs all water flow into the baitwell receptacle. At the same time, the valve inlets prevent backflow into the pump or conduit.

An additional feature of the invention is a pressure sensitive switch typically positioned at the inlet of the pump. When the boat is stationary the operator can choose to electrically actuate the pump to fill the baitwell. If the operator accelerates the boat beyond a certain speed, say 10 miles per hour, the pressure switch opens and automatically stops the pump. Therefore, the baitwell will continue to be filled by the force of the water being driven into the charging means yet the pump will not be operationally actuated.

BRIEF DESCRIPTION OF THE DRAWINGS

The novel features which are believed to be characteristic of the invention are set forth in the apended claims. The invention itself, however, together with further objects and attendant advantages thereof, will best be understood by reference to the following description taken in connection with the accompanying drawings, in which:

DETAILED DESCRIPTION OF THE PREFERRED EMBODIMENTS

Figure 1:
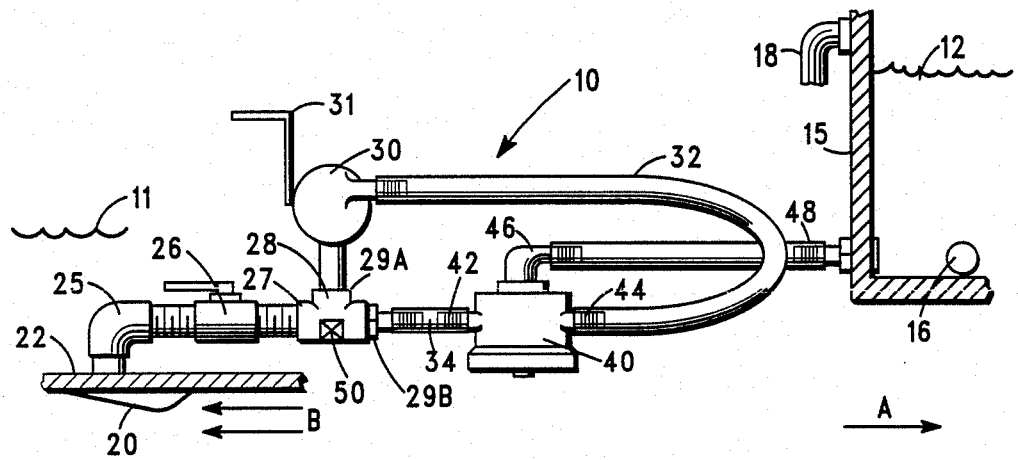
FIG. 1 is a schematic of the distribution system in communication with a water source and a baitwell.

FIG. 1 schematically depicts the configuration of the present invention generally shown as 10, which would be placed inside a fishing boat. A baitwell receptacle 15 is shown with a desired water level 12 that is higher than the water level 11 of the source, such as a river or lake. The baitwell 15 will typically have a drain 16 and an overflow valve 18.

The baitwell is filled in one of two ways. When the boat is stationary, pump 30 draws water into the system 10 and ultimately pumps it to the baitwell 15. Alternatively, the pump 30 can be turned off and the baitwell filled by the movement of boat. When the boat moves rapidly in the direction shown by arrow A, water is forced into the pickup 20 as shown by arrows B. The high speed pickup 20, which is outside the hull 22 of the boat, is in fluid communication with a pipe or conduit 25 inside the boat, and its structure and function are well known to those of ordinary skill in the art.

Once water has entered the system 10, operation of pickup by the pickup 20 and the movement of the boat, its path is easily followed. Water flows through the conduit 25 to the inlet 27 of a tee fixture 28. At the fixture 28 the water diverges. Half the flow pdasses through outlet 29A and through pump 30 into conduit 32. The other half passes through outlet 29B and into conduit 34.

The water then flows into check valve 40. Approximately, one-half of the flow passes through conduit 34 into valve inlet 42. while the other half of the flow passes through conduit 32 into valve inlet 44. All of the flow entering valve 40 exits the valve outlet 46 into conduit 48 and is directed into the baitwell receptacle 15. The check valve is exemplified by those available from Flow-Rite Controls, Ltd. of Grand Rapids, Mich. and described in a pending application, Ser. No. 195,810, the disclosure of which is incorporated herein by reference.

Preferably, the cross-sectional area of outlet 46 is about the same or greater than the combined cross-sectional area of the two valve inlets, 42 and 44. This assures that there will be no significant pressure drop across the valve and potential damage to pump seals.

One of the novel aspects of this invention is the configuration of the piping, pump, and check valve. It is well known in the fluid arts that the flow is directly proportional to the square root of the pressure. Consequently, if the fluid flow entering the pump can be reduced by a factor of two, the pressure inside the pump can be reduced by a factor of four. By so doing, the present invention can use small through-transom aerator pumps. These are low pressure pumps that cost approximately $10 to $12. They perform quite satisfactorily for static applications when the boat is stationary. The pumps would not, hwoever, perform satisfactorily in the prior art devices. In the prior art pumps, the velocity of the increased flow would create a pressure head significantly higher than that of the present invention when the system was being charged by the movement of the boat. That is why the prior art devices required expensive, multipurpose pumps costing approximately $80-$100 and have stronger housings and strong seals. The prior art pumps require large capacity and are used for multiple purposes, such as washing down the boat as well as filling the baitwell.

Another feature of the present invention is the rduced power drain on batteries created by the smaller pumps. The small pumps described above typically require 2 amps to operate the pump motor, whereas prior are devices require 7 to 12. This result is significant, especially in smaller boats where the pump is not electrically run by a generator that is part of the boat's motor.

Despite the reduced pressure on the pump by the present invention, the water flow still causes some vibration. It is, therefore, prferred to fasten pump 30 as securely possible. Thus, it is desirous to have the inlet of pump 30 threaded into the outlet 29A of fixture 28. Moreover, it is also helpful to secure the pump 30 by additional external means. By way of example, a bracket 31 is depicted.

The pump 30 is designed to operate when the boat is stationary or travelling at low speeds, such as those typically used while trolling. The pump motor itself is run from the electrical system of the boat engine in a manner known to those of ordinary skill in the art. If, however, the boat is accelerated, the pressure of the water being driven through the high speed pickup 20 and into the system 10 increases the inlet pressure and obviates the need for the pump 30. Therefore, a pressure switch 50 is installed at the inlet to the pump 30. When the pressure in system 10 increases beyond a preselected value representative of a predetermined boat speed, the pressure switch 50 opens and the pump 30 is turned off. Conversely, if the pump has been turned on by a switch in the boat, but has been disengaged by pressure switch 50, when the boat slows to a speed such that the water pressure in system 10 is insufficient to keep the pressure switch 50 open, the switch 50 will close and thus automatically actuate pump 30.

Another feature of the present invention is a seacock 26, which is a valve that can be variably opened and closed to prevent flow through the system 10. Although a handle is depicted in FIG. 1, it is known to those of ordinary skill in the art that such a valve operation could be automatically accomplished by hydraulic or electromechanical means. The seacock has several purposes. Obviously it can stop flow to or from the well in times of emergency or repair. Similarly, it can prevent filling of the baitwell at the beginning of a long trip. That reduces weight and ensures fresh water at the time desired. Also, if the seacock is left only partially open, it can decrease the rate of flow of water into the baitwell. This is particularly important when the boat is travelling at very high speeds. Typically, as shown in FIG. 1, the seacock is located in-line between the high speed pickup 20 and the flow division.

Figure 2:
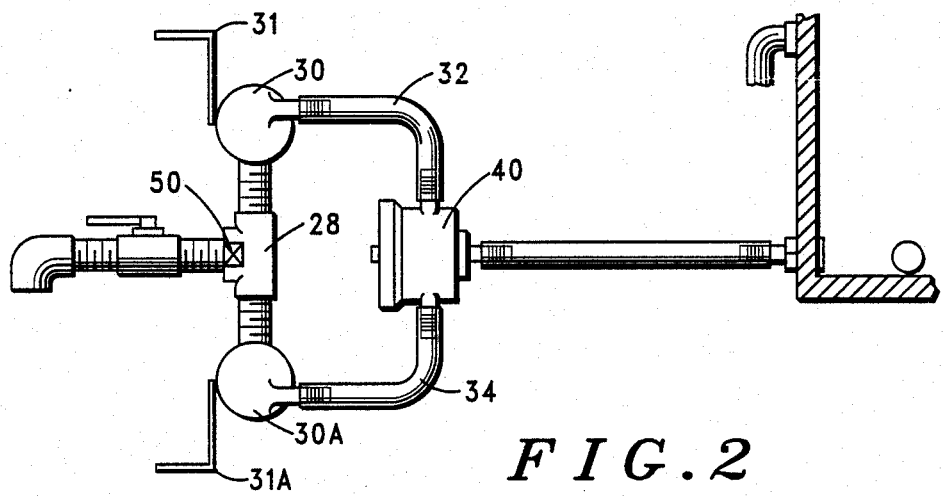
FIG. 2 is an alternative embodiment of the invention including a back-up pump.

Another embodiment of the present invention is shown in FIG. 2. A second pump 30A is supported by bracket 31A. It is recognized by those who fish competitively that the baitwell must remain filled. Consequently, a second pump 30A is provided in case of failure by the first pump 30. Other features of the invention, such as the flow dividing means 28, pressure switch 50, and check valve 40 would remain substantially the same.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

What is claimed is:

1. An apparatus to provide and control water flow from an external water source to a well receptacle in a boat, said boat being used in both moving and stationary states in said water source, said apparatus comprising:
   a main inlet in communication with said external water source and having means for charging water from said water source into said main inlet when said boat is moving;
   a conduit in communication with said main inlet and having first and second outlets;
   a dual check valve having first and second valve inlets and one valve outlet, said first valve inlet being in communication with said first conduit outlet and having means permitting water flow only from said conduit into said valve;
   a pump having an inlet port in communication with said second conduit outlet and an output port in communication with said second valve inlet, said second valve inlet having means permitting water flow only from said pump into said valve; and
   said valve outlet being in communication with an inlet into said well receptacle.

2. The apparatus of claim 1 wherein said valve outlet has a cross-sectional area at least as large as the combined cross-sectional area of said first and second valve inlets.

3. The apparatus of claim 2 wherein said pump is a centrifugal pump.

4. The apparatus of claim 1 further comprising means sensitive to fluid flow for controlling the operation of said pump.

5. The apparatus of claim 4 further comprising means for preventing flow into said conduit.

6. The distribution system of claim 5 wherein said flow prevention means is located between said pump and said main inlet.

7. The apparatus of claim 1 further comprising a second pump in communication with said conduit and said valve means.

8. A water distribution system to provide flow from a water source to a well in a boat used in moving and stationary states, comprising:
   a high speed water pickup;
   a water conduit in communication with said pickup;

a flow dividing device, comprising three ports, one of said ports being in fluid communication with said conduit;

a pump in communication with said flow dividing device; and a dual check valve in communication with said fow dividing device and with said pump.

9. The water distribution system of claim 8 wherein said check valve is also in communication with a baitwell.

10. The water distribution system of claim 9 further comprising control means responsive to fluid flow for starting and stopping the operation of said pump.

11. The water distribution system of claim 10 wherein said control means is located proximate to the inlet of said pump.

12. The water distribution system of claim 10 further comprising a second pump in communication with said flow dividing device and with said check valve.

13. The water distribution system of claim 10 wherein said pump is adapted to provide aerated water to said baitwell.

14. The water distribution system of claim 10 wherein said check valve permits recirculation of water in said baitwell.

15. The water distribution system of claim 10 further comprising a securing device to prevent vibration of said pump.

16. The water distribution system of claim 15 further comprising selectively operable valve means for restricting flow into said system.

17. A water distribution system to provide flow from a water source to a well in a boat being used in moving and stationary states, comprising:

a high speed water pickup;

a flow dividing means comprising an inlet and first and second outlets;

means for fluidly communicating between said pickup and said flow dividing inlet;

a pump in fluid communication with said first flow dividing outlet; and a dual check valve comprising first and second inlets and an outlet, said first inlet being in fluid communication with said second flow dividing outlet, said second inlet being in fluid communication with said second flow dividing outlet, and said valve outlet being in fluid communication with the well.

18. The distribution system of claim 17 further comprising a second pump in fluid communication with said second flow dividing outlet and said first valve inlet.

19. The distribution system of claim 17 further comprising fluid control means for starting the stopping the operation of said pump.

20. The distribution system of claim 17 wherein said valve outlet is in fluid communication with said baitwell at the substantially lowest elevation of said baitwell.

21. The distribution system of claim 17 wherein said valve outlet has a cross-sectional area at least as large as the combined cross-sectional area of said first and second inlets.

* * * * *